(No Model.)
R. S. WARING & J. B. HYDE.
PROCESS OF AND APPARATUS FOR INSULATING WIRE FOR ELECTRIC USES.
No. 267,044. Patented Nov. 7, 1882.
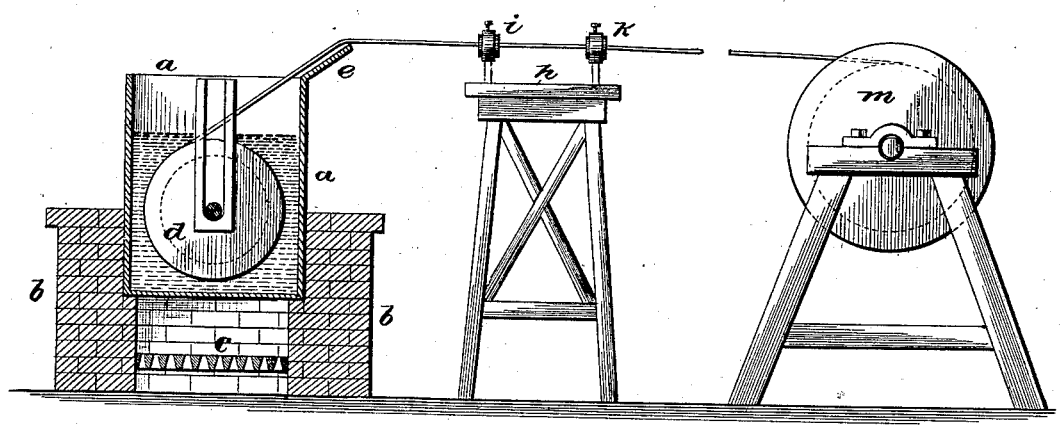

UNITED STATES PATENT OFFICE.

RICHARD S. WARING, OF PITTSBURG, PENNSYLVANIA, AND J. BURROWS HYDE, OF NEW YORK, N. Y.

PROCESS OF AND APPARATUS FOR INSULATING WIRES FOR ELECTRIC USES.

SPECIFICATION forming part of Letters Patent No. 267,044, dated November 7, 1882.

Application filed July 17, 1882. (No model.)

*To all whom it may concern:*

Be it known that we, RICHARD S. WARING, a citizen of and residing at Pittsburg, county of Allegheny, State of Pennsylvania, and J. BUR-ROWS HYDE, a citizen of and residing at the city, county, and State of New York, have invented certain new and useful Improvements in Process of and Apparatus for Insulating Wires for Electric Uses, of which the following is a specification, reference being had therein to the accompanying drawings.

Our invention relates chiefly to insulating the wires for underground cables for telegraphs, telephones, electric-lighting, and similar purposes. The wires, after being treated by our process, will be found to be advantageous for use above ground and under water, or along the beds of rivers, &c.

The object of our invention is to insulate wires by immersing them in an insulating compound, which compound will form the subject of a separate application.

Our present invention consists in the application of insulating media to electric wires in the following manner: by first covering the wire with cotton or other fibrous material in the usual way, then immersing the prepared wires, in coils or otherwise, into baths of heated insulating material at high temperature, to expel all moisture therefrom and saturate the fiber with the mixture.

It further consists in the use of cotton or other fiber covered wires for electric uses, the process of immersing such covered wires upon reels in a bath or baths of heated insulating compound, and then drawing from such bath immersed reels by a second and storing reel through an intermediate and gaging mold or plate, as will be hereinafter more fully described.

Having thus described the nature of our invention, we will now describe the drawings hereto annexed, which show an example of our method of carrying the same into practice.

Figure 1 is a vertical transverse section of a molding-kettle to receive melted composition after its preparation in the melting and mixing kettle, (not shown;) Fig. 2, an end view of a molding-table. Fig. 3 represents a receiving and storing reel; Fig. 4, a plan view of a series of reels in the molding-kettle. Fig. 5 is a plan view of a molding-table. Fig. 6 represents a coil of prepared wire. Fig. 7 is an enlarged view of strippers and gages of $i$ and $k$, with holding-band and set-screw.

The same letters denote like parts in all the figures.

$a$ is the molding-kettle; $b$, the fire-place, composed of masonry, which supports the molding-kettle; $c$, the grate-bars; $d$, reels rotating on movable bearings in journals fixed in the ends of the molding-kettle, carrying covered wires; $e$, stripping-band to remove excess of hot composition as it escapes from the submerged reel; $h$, molding-table; $i$, dies of metal or other proper material, having conical perforations to strip off excess of composition from the wires; $k$, molding-dies of similar shape to gage the covered wire, and $m$ receiving and storing reel and stand.

In the application of insulating media to electric wires it is common to first wind or braid the wire with several coverings of cotton thread by machinery, and then coat or varnish this cotton with some insulator; and after the inner layer is so varnished and the outer ones left unprotected and exposed to the air, most vegetable fiber, and particularly the cotton thread used for this purpose, is found to be greatly hydroscopic, as if weighed and then placed in an oven heated to 212° Fahrenheit it will part with its moisture and be reduced in weight. Removed again to the air, it will soon reabsorb moisture and return to its original weight. We have found that to insure reliable and permanent insulation to the wires every possible trace of moisture must be expelled, and practically the only method for effecting that object is the one we have discovered, and wherein the moisture cannot possibly cause trouble thereafter. We place the covered wire in proper and convenient lengths upon reels that will readily fit into a heating-vessel of proper material—say two or more abreast lengthwise. The vessel, standing over a heating-furnace, is properly filled with insulating material previously melted and mixed in another vessel, and heated above 212° Fahrenheit, preferably 300°. Into this heated mixture we immerse the reels and their contents. The excessive heat will at once convert the moisture into vapor, expelling it from the cotton, and rising through the insulator as steam converts the substance near the surface into a fine frothy mass, demanding care that it does not exceed the capacity of the molding-vessel itself. The composition will at the same time penetrate the cotton to the wires, effectually sealing them against any possible penetration of aqueous matter at any time thereafter.

In use we employ the obsidine, tempered with a softer medium to give flexibility and elasticity, as a first coat, and then immerse the reel in a vessel containing the ambertine to obtain a better and non-adhesive surface; but for general use we prefer to mix the two together, with or without the olivine or other compounds. When the froth ceases to rise it will indicate freedom from moisture. The wire may be then reeled off upon a receiving-reel, placed at a proper distance for the wire to cool before reaching and winding on the reel; and we place intermediately between the reels, but nearer the first, a stripping and molding block consisting of a conical perforation or aperture through a metal block or plate, to strip off any excess of the composition and gage the coating evenly.

Among the distillates of petroleum and other mineral oils is paraffine, which is usually separated from its associate compounds by the usual mechanical pressure. We distinctly exclude paraffine from our employment. Its low melting-point and other features render it unfit for our use.

It may be said that electric wires properly coated and insulated with our compound or composition will withstand the various changes of temperature, moistures, and is perfectly impervious to water, so that the wire is preserved from oxidation, and therefore not liable to be removed after being once laid.

Having described our invention, what we claim as new, and desire to secure by Letters Patent, is—

1. In the insulation of cotton or fiber covered wires for electric uses, the process of immersing such prepared wires, in coils or otherwise, into baths of heated insulating material at high temperature, to expel all moisture therefrom and saturate the fiber with mixture, substantially as and for the purpose set forth.

2. In the use of cotton or other fiber covered wires for electric uses, the process of immersing such covered wires upon reels in a bath or baths of heated insulating compound, and drawing it from such bath immersed reels by a second and storing reel through an intermediate and gaging mold or molds, substantially in the manner and for the purpose set forth.

3. The method herein described of insulating wire, consisting of first heating the compound to the required temperature, then immersing fiber-coated wire in said compound, releasing the cotton or other fiber of all moisture and thoroughly saturating it, then drawing the insulated wire through gaging devices, and finally reeling it on a receiving and storing reel.

RICHARD S. WARING.
J. BURROWS HYDE.

Witnesses:
JOHN HENRY MILLER,
JOS. W. MARSH.